(12) United States Patent
Neiger et al.

(10) Patent No.: US 11,048,588 B2
(45) Date of Patent: Jun. 29, 2021

(54) MONITORING THE OPERATION OF A PROCESSOR

(71) Applicant: Intel Corporation, Santa Clara, CA (US)

(72) Inventors: Gilbert Neiger, Portland, OR (US); Andrew V. Anderson, Forest Grove, OR (US); Richard A. Uhlig, Hillsboro, OR (US); David M. Durham, Beaverton, OR (US); Ronak Singhal, Portland, OR (US); Xiangbin Wu, Beijing (CN); Sailesh Kottapalli, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/787,333

(22) Filed: Feb. 11, 2020

(65) Prior Publication Data
US 2020/0257609 A1    Aug. 13, 2020

Related U.S. Application Data

(63) Continuation of application No. 15/827,890, filed on Nov. 30, 2017, now Pat. No. 10,599,547, which is a (Continued)

(51) Int. Cl.
*G06F 11/14* (2006.01)
*G06F 9/455* (2018.01)
(Continued)

(52) U.S. Cl.
CPC .......... *G06F 11/1407* (2013.01); *G06F 9/455* (2013.01); *G06F 11/3024* (2013.01);
(Continued)

(58) Field of Classification Search
CPC .................. G06F 11/1402; G06F 11/1407
(Continued)

(56) References Cited

U.S. PATENT DOCUMENTS 7,080,283 B1    7/2006 Songer et al.
7,802,110 B2    9/2010 Morais
(Continued)

FOREIGN PATENT DOCUMENTS

TW    201333188 A    8/2013
WO    2010/014109 A1    2/2010

OTHER PUBLICATIONS

Office Action, TW. App. No. 105137104, dated Sep. 30, 2020, 14 pages (8 pages of English Translation and 6 pages of Original Document).
(Continued)

*Primary Examiner* — Joseph R Kudirka
(74) *Attorney, Agent, or Firm* — Nicholson De Vos Webster & Elliott LLP

(57) ABSTRACT

Embodiments of an invention for monitoring the operation of a processor are disclosed. In one embodiment, a system includes a processor and a hardware agent external to the processor. The processor includes virtualization logic to provide for the processor to operate in a root mode and in a non-root mode. The hardware agent is to verify operation of the processor in the non-root mode based on tracing information to be collected by a software agent to be executed by the processor in the root mode.

8 Claims, 6 Drawing Sheets

METHOD 400

Related U.S. Application Data continuation of application No. 14/973,238, filed on Dec. 17, 2015, now Pat. No. 9,858,167.

(51) Int. Cl.
 *G06F 11/30* (2006.01)
 *G06F 11/34* (2006.01)
 *G06F 13/24* (2006.01)

(52) U.S. Cl.
 CPC .......... *G06F 11/3466* (2013.01); *G06F 13/24* (2013.01); *G06F 2201/815* (2013.01)

(58) Field of Classification Search
 USPC .............................................. 714/45; 718/1
 See application file for complete search history.

(56) References Cited

U.S. PATENT DOCUMENTS

| | | | |
|---|---|---|---|
| 8,286,162 B2 * | 10/2012 | Neiger | G06F 9/4812 718/1 |
| 8,719,814 B2 | 5/2014 | Wookey | |
| 8,776,028 B1 | 7/2014 | Enakiev et al. | |
| 9,195,570 B2 | 11/2015 | Tripp | |
| 9,720,798 B2 | 8/2017 | Fink et al. | |
| 2006/0143600 A1 | 6/2006 | Cottrell et al. | |
| 2008/0168435 A1 | 7/2008 | Tupman et al. | |
| 2009/0007112 A1 | 1/2009 | Moriki et al. | |
| 2010/0153924 A1 | 6/2010 | Andrews | |
| 2010/0229158 A1 | 9/2010 | Ike | |
| 2011/0098973 A1 | 4/2011 | Seidman | |
| 2012/0066551 A1 | 3/2012 | Palus et al. | |
| 2014/0074451 A1 | 3/2014 | Letz et al. | |
| 2014/0259011 A1 * | 9/2014 | Tashiro | G06F 9/45558 718/1 |
| 2015/0121135 A1 * | 4/2015 | Pape | G06F 11/1484 714/15 |

OTHER PUBLICATIONS

Gebai et al.,"Virtual Machines CPU Monitoring with Kernel Tracing" 2014 IEEE 27th Canadian Conference on Electrical and Computer Engineering (CCECE); May 4, 2014, pp. 1-6.

International Preliminary Report on Patentability, PCT App. No. PCT/US2016/062575, dated Jun. 28, 2018, 6 pages.

International Search Report and Written Opinion, PCT App. No. PCT/US2016/062575, dated Feb. 27, 2017, 7 pages.

Non-Final Office Action, U.S. Appl. No. 14/973,238, dated May 15, 2017, 32 pages.

Non-Final Office Action, U.S. Appl. No. 15/827,890, dated Jun. 27, 2019, 29 pages.

Notice of Allowance, U.S. Appl. No. 14/973,238, dated Sep. 8, 2017, 5 pages.

Notice of Allowance,U.S. Appl. No. 15/827,890, dated Nov. 15, 2019, 13 pages.

* cited by examiner

MONITORING THE OPERATION OF A PROCESSOR

BACKGROUND

Field

The present disclosure pertains to the field of information processing, and more particularly, to the field of verification in information processing systems.

Description of Related Art

Verification of the correct operation of a processor in an information processing system may be important for a number of reasons, including quality assurance, reliability, and security. Various techniques that may be useful for this purpose, such as check-pointing and tracing, have been developed. Some of these techniques may be regarded as internal, for example, when the processor itself provides some form of authentication to an external agent. Others may be regarded as external, for example, when an agent or component outside the processor monitors the operation of the processor. External verification may require substantial access to the signal pins and/or connections between the processor and the rest of the system.

BRIEF DESCRIPTION OF THE FIGURES

The present invention is illustrated by way of example and not limitation in the accompanying figures.

DETAILED DESCRIPTION

Figure 1:
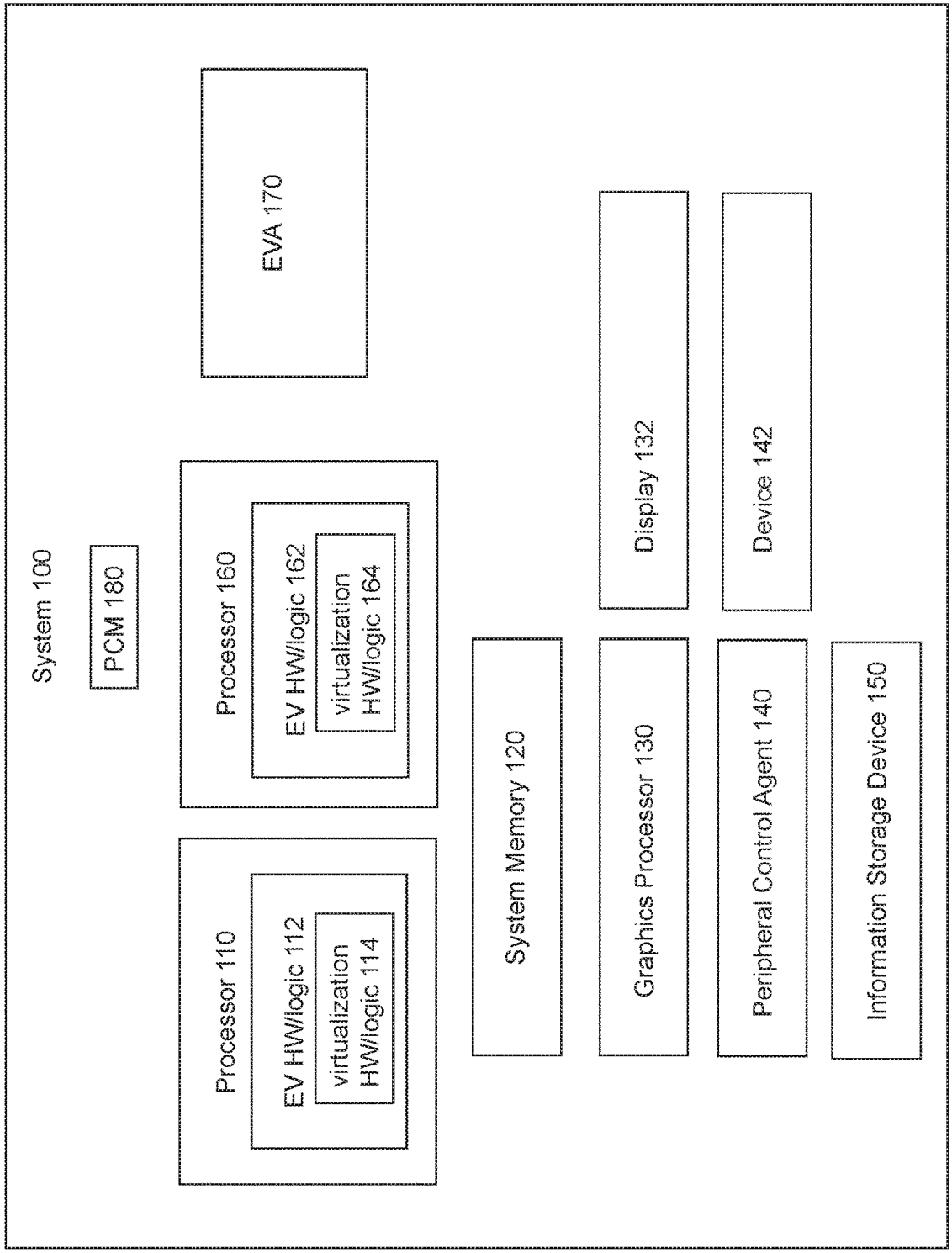
FIG. 1 illustrates a system including support for monitoring the operation of a processor according to an embodiment of the present invention.

Embodiments of an invention for monitoring the operation of a processor are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "I" character between terms may mean that an embodiment may include or be implemented using, with, and/or according to the first term and/or the second term (and/or any other additional terms).

As described in the background section, techniques have been developed that may be useful for verifying the correct operation of a processor in an information processing system. Embodiments of the present invention may provide new approaches for an external agent to monitor or verify a processor's operation, which may be desirable because they do not require access to all of the signal pins of the processor.

FIG. 1 illustrates system 100, an information processing system including an embodiment of the present invention for monitoring the operation of a processor. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, information storage device 150, processor 160, and external agent 170. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory (DRAM) or any other type of medium readable by processors 110 and/or 160. Although shown as a single block in FIG. 1, system memory 120 may include multiple components in various configurations. For example, in a non-uniform memory access (NUMA) architecture, system memory 120 may be logically extended across multiple processor sockets with a communication bus.

Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processors 110 and/or 160. Information storage device 150 may represent any one or more components including any one more types of persistent or non-volatile memory or storage, such as a flash memory and/or a solid state, magnetic, or optical disk drive.

Processor 110 may represent all or part of a hardware component including one or more processors or processor cores integrated on a single substrate or packaged within a single package, each of which may include multiple execution threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 110 may be architected and designed to operate according to any instruction set architecture (ISA), with or without being controlled by microcode.

Processor 110 may support virtualization of resources according to any approach. Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtual environment").

A processor in an information processing system may support virtualization, for example, by operating in two modes—a "root" mode in which software runs directly on the hardware, outside of any virtualization environment, and a "non-root" mode in which software runs at its intended privilege level, but within a virtual environment hosted by a VMM running in root mode. In the virtual environment, certain events, operations, and situations, such as interrupts, exceptions, and attempts to access privileged registers or resources, may be intercepted, i.e., cause the processor to exit the virtual environment (a "VM exit") so that the VMM may operate, for example, to implement virtualization policies. The processor may support instructions for establishing, entering (a "VM entry"), exiting, and maintaining a virtual environment, and may include register bits or other structures that indicate or control virtualization capabilities of the processor.

Additionally, support for external monitoring according to an embodiment of the present invention may be provided by a processor, such as processor 110, using any combination of circuitry and/or logic embedded in hardware, microcode, firmware, and/or other structures arranged as described below or according to any other approach, and is represented in FIG. 1 as external verification (EV) hardware/logic 112, which may include or be fully implemented in virtualization hardware/logic 114 to support virtualization. As such, virtualization hardware/logic 114 and/or all of the hardware/logic of EV hardware/logic 112 may be present in processor 110 for any one or more purposes in addition to external verification.

In an embodiment in which system 100 represents a multiprocessor system, processor 100 may represent one or more processors, and may be referred to as a first processor, and system 200 may also include a second processor, represented by processor 160 in FIG. 1, and/or any number of additional processors. Processor 160 may represent any type of processor, including a processor identical to, compatible with, in the same family as, sharing any portion of the same ISA with, and/or differing in any way from processor 110. Processor 160 may include EV hardware/logic 162 and/or virtualization hardware/logic 164, each of which may be analogous to the corresponding part of processor 110.

External verification agent (EVA) 170 may represent any agent, such as a third processor, field programmable gate array, or other hardware component that is external to processor 110. In various embodiments of the present invention, external may mean one or more of the following: EVA 170 is not within the same integrated circuit as processor 110, EVA 170 and processor 110 are in different integrated circuits, EVA 170 is not on the same die or substrate as processor 110, EVA 170 is on a different die or substrate than processor 110, EVA 170 is not within the same package as processor 110, EVA 170 and processor 110 are in different packages, and/or EVA 170 is outside of a boundary defined by a set of pins or connectors through which processor 110 may send and receive signals to and from one or more agents or components outside of the boundary. As an external agent, in some embodiments EVA 170 may monitor and/or intercept transactions on a system memory bus (e.g., between processor 100 and system memory 120) and/or an input/output bus (e.g., a Peripheral Component Interconnect Express (PCIe) bus to network controllers, storage devices, keyboard/mouse, graphics and display, etc.). In an embodiment including a second processor, e.g., processor 160, EVA 170 is also external to processor 160.

EVA 170 represents hardware or a hardware agent to verify the operation of one or more processors (e.g., processors 110 and/or 160) according to an embodiment of the present invention, including circuitry for executing instructions and for reading from and writing to system memory (directly or indirectly). In various embodiments, EVA 170 may represent a processor (such as a processor identical to, compatible with, in the same family as, sharing any portion of the same ISA with, and/or differing in any way from processor 110 and/or 160) programmed or programmable to verify the operation of another one or more processors or a controller or other hardware agent configured or configurable (e.g., with firmware) to verify the operation of one or more processors.

Platform-checking module (PCM) 180 represents a software agent (defined below) to be executed by one or more processors to collect information reflecting and/or related to the operation of the processor(s) that may be used by an EVA to verify the operation of the processor(s). A software agent may be any program, software module, software component, software agent, or other sequence of instructions executable by a processor in system 100 or translatable or convertible to a sequence of instructions executable by a processor in system 100, as stored on any non-volatile medium readable by a processor in system 100, and/or all or any portion thereof as copied to any volatile or non-volatile medium readable by a processor in system 100, such as system memory 120 and/or any cache memory within or accessible to a processor. As such, PCM 180 may, in various embodiments, be stored as software or firmware within any memory, storage, and/or component in system 100, and may, in whole or in various parts, be moved and/or copied to any memory in system 100 at various times and in various configurations during the operation of system 100. For example, PCM 180 may be stored in information storage device 150, loaded in whole or in part into system memory 120 for execution by one or more processors such as processor 110 and/or 160, and copied in part into one or more cache memories within and/or accessible to any one or more of the processors by which it is executed. Accordingly, in various embodiments, multiple instantiations of PCM 180 may be running simultaneously or concurrently, for example, on different execution cores. Furthermore, different types of PCMs may be used to monitor different modes of processor operation (e.g., host mode, system management mode) or different execution cores in partitioned systems.

Figure 2:
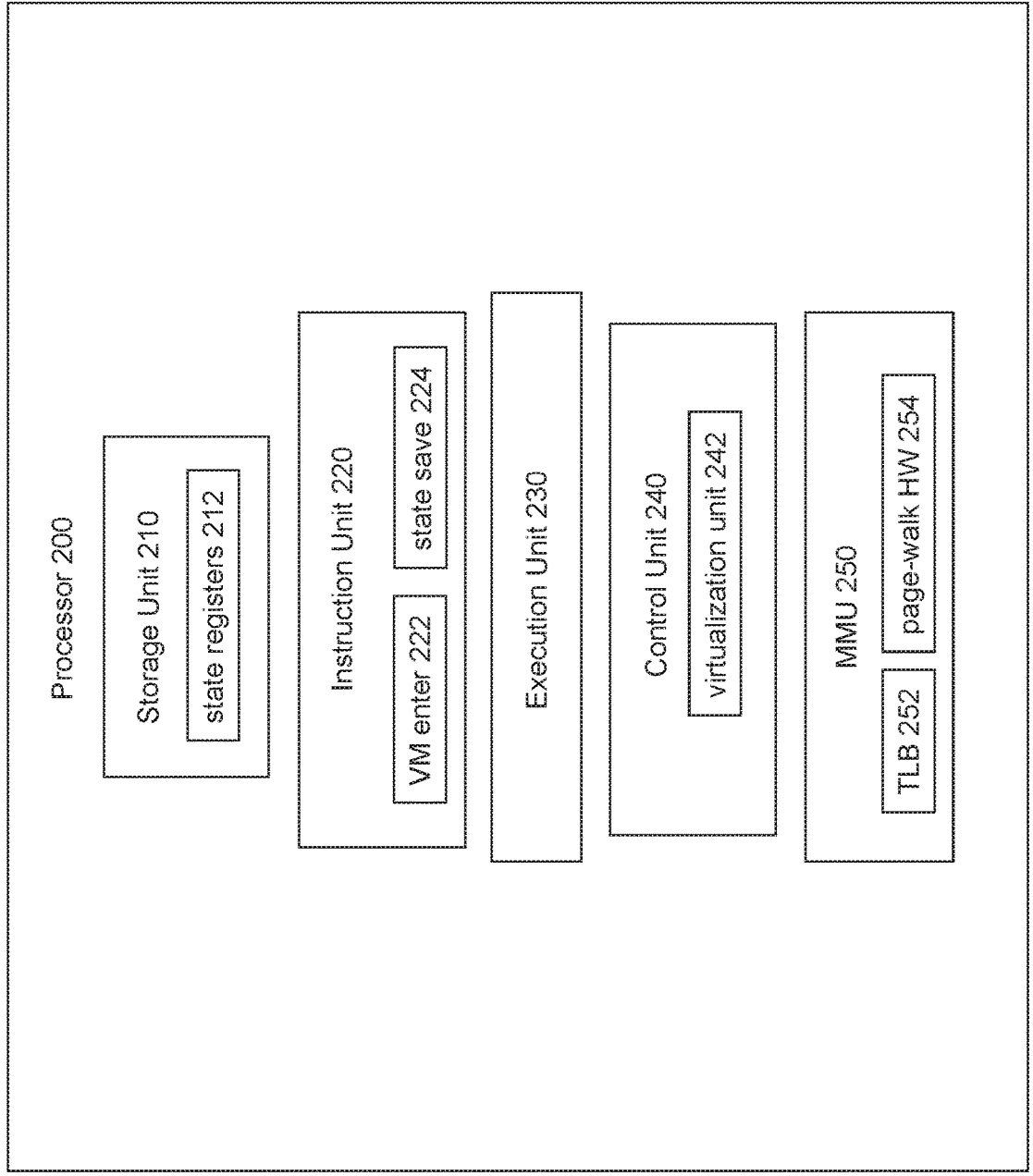
FIG. 2 illustrates a processor including support for monitoring according to an embodiment of the present invention.

FIG. 2 illustrates processor 200, which may represent an embodiment of processor 110 and/or 160 in FIG. 1 or an execution core of a multicore processor embodiment of processor 110/160 in FIG. 1. Processor 200 may include storage unit 210, instruction unit 220, execution unit 230, control unit 240, and memory management unit (MMU) 250, where the circuitry, structure, and functionality of EV hardware/logic 112/162 of FIG. 1 may be contained within and/or distributed among any of such units. Processor 200 may also include any other circuitry, structures, or logic (e.g., performance counter hardware) not shown in FIG. 1.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage and/or to cause or support various operations and/or configurations associated with access to such storage. In various embodiments of the present invention, storage unit 210 may include one or more registers or other state storage locations (state registers 212), the contents of which may copied or moved to system memory 120 in connection with saving the state of processor 200 (e.g., with a state save instruction 224) and which may be loaded or written from system memory 120 in connection with restoring the state of processor 200.

Instruction unit 220 may include any circuitry, logic, structures, and/or other hardware, such as an instruction decoder, to fetch, receive, decode, interpret, schedule, and/or handle instructions, such as a VM enter instruction 222 and state save instruction 224, to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach. VM enter instruction 222 may represent any one or more instructions, in any instruction set, by which control may be transferred to a VM, for example, by a VMM for an initial entry into a newly created VM or for a subsequent entry (i.e., following a previous VM entry and a VM exit) into a previously created VM.

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units.

Control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information stored in storage unit 210. Control unit 240 may include virtualization unit 242 to provide for processor 200 to intercept certain events occurring in a VM and cause a VM exit.

MMU 250 may include any circuitry, logic, structures, and/or other hardware to manage system memory, such as providing for the virtualization of physical memory according to any desired approach and the protection of system memory. In an embodiment, MMU 250 supports the use of virtual memory to provide software, including software running in a VM, with an address space for storing and accessing code and data that is larger than the address space of the physical memory in the system, e.g., system memory 120. The virtual memory space of processor 200 may be limited only by the number of address bits available to software running on the processor, while the physical memory space of processor 200 may be limited to the size of system memory 120. MMU 250 supports a memory management scheme, such as paging, to swap the executing software's code and data in and out of system memory 120 on an as-needed basis. As part of this scheme, the software may access the virtual memory space of the processor with an un-translated address that is translated by the processor to a translated address that the processor may use to access the physical memory space of the processor.

Accordingly, MMU 250 may include translation lookaside buffer 252 in which to store translations of a virtual, logical, linear, or other un-translated address to a physical or other translated address, according to any known memory management technique, such as paging. To perform these address translations, MMU 250 may include page-walk hardware 254 to refer to one or more data structures stored in processor 200, system memory 130, storage locations in system 100 not shown in FIG. 1, and/or any combination of these locations. These data structures may include page directories, page tables, and other paging data structures according to any known paging architecture. Each such paging data structure, as well as TLB 252, may include (or have associated with individual or groups of entries) one or more bits or other indicators to be used to indicate and enforce various permissions (e.g., read, write, or execute) that may define or restrict access to pages (or other regions) of memory.

Figure 3:
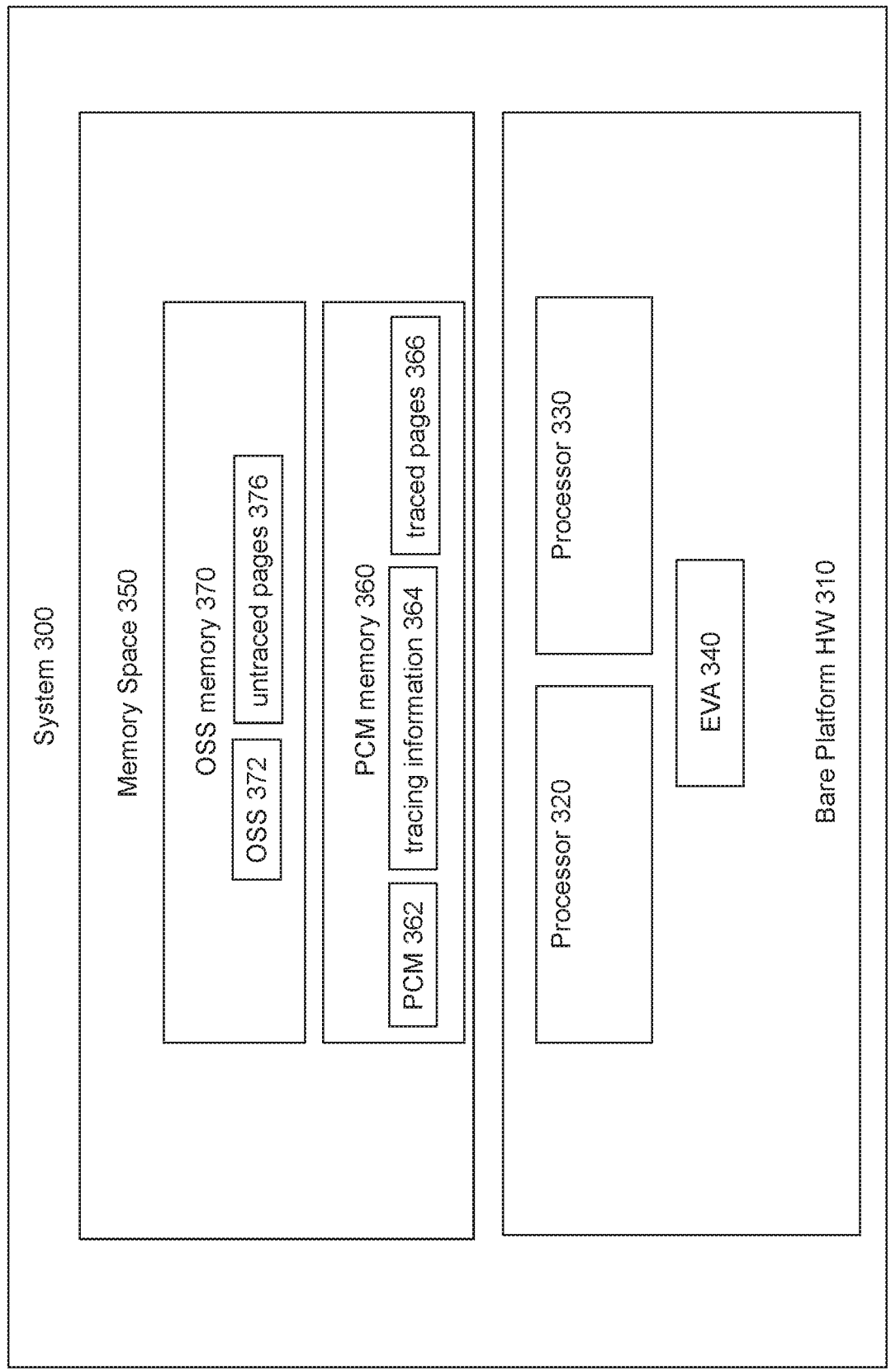
FIG. 3 illustrates a system including hardware and software to monitor the operation of a processor according to an embodiment of the present invention.

FIG. 3 illustrates another view of a system including hardware and software to monitor the operation of a processor. In FIG. 3, system 300 includes bare platform hardware 310 which may represent the hardware of system 100 in FIG. 1. Bare platform hardware 310 is shown as including processor 320, processor 330, and EVA 340, corresponding to processor 110, processor 160, and EVA 170, respectively, in FIG. 1, but may include any number of processors.

FIG. 3 also shows system memory space 350, representing the memory space in the system architecture of system 300, addressable by any one or more processors in system 300. System memory space 350 may represent a virtual system memory space provided by a memory virtualization technique based on a physical system memory such as system memory 120 is FIG. 1. As such, system memory space 350 is an abstraction of physical memory and may, at various times during the operation of system 300, may be storing various combinations of data, instructions, code, programs, software, and/or other information in various memories and/or other storage locations within system 300.

Although not shown in FIG. 3, a system according to an embodiment of the present invention may include one or more memory spaces in addition to a system memory space as shown in FIG. 3. For example, to support the operation of a processor in a system management mode (SMM), a system may include an SMM memory space (SMRAM) that is separate from the system memory space. Therefore, embodiments of the present invention may provide for a second PCM to reside in SMRAM and/or monitor access to SMRAM.

For convenience, FIG. 3 shows system memory space 350 as a single, contiguous memory space. However, system memory space 350 may be logically organized, addressable as, and/or otherwise partitioned (e.g., using memory partitioning/protection techniques provided by MMU 250) into regions of one or more uniform sizes. In various embodiments, such regions may be 4K-byte pages, so, for convenience, such regions may be referred to in this description as pages; therefore, the use of the term "page" in this description may mean any size region of memory.

Furthermore, any number of such regions in any combination may be protected in such that some portions of system memory space 350 are accessible to certain software, components, and/or VMs, but inaccessible to other software, components and/or VMs. For example, system memory space 350 may include PCM memory 360 and ordinary software stack (OSS) memory 370, where PCM memory 360 includes and is accessible to PCM 362, and OSS memory 370 includes and is accessible to other software (OSS 372, e.g., operating system and application software) being executed and/or executable by one or more processors in system 300. PCM memory 360 is accessible by one or more processors (e.g., processors 320 and/or 330) in system 360, such that PCM 362 may be executed by one or more processors (e.g., processors 320 and/or 330), but PCM memory is protected from and inaccessible to OSS 372. Also, PCM memory 360 includes tracing information memory 364 and traced pages memory 366, both of which are accessible to EVA 350, in which to store tracing information and traced pages, respectively, both as described below; and OSS memory 370 includes untraced pages 376, as described below.

In various embodiments, PCM 362 may be implemented as a VMM or hypervisor or a software or firmware module or component of a VMM or hypervisor (so the PCM may be referred to as a "host" or "host" software), in a single VMM or layered or multiple VMM virtualization architecture, and may therefore be capable of partitioning system memory 340 into PCM region 360 and creating and maintaining a VM to contain OSS memory region 370 (so OSS 372 may be referred to as a "guest" or "guest" software because the OSS is a guest in the virtualization environment hosted by the PCM). Accordingly, interrupts generated by EVA 340 may be used to cause a VM exit from a VM in which the OSS is operating and a transfer of control of a processor to PCM 362 from software within OSS 372.

In various embodiments, EVA 340 may generate a first interrupt to begin a sampling interval and a second interrupt to end the sampling interval. As further described below, PCM 362 may collect information at the beginning, end, and/or during the sampling interval that may be used, along with other information from OSS memory 370, by EVA 340 to verify the operation of one or more processors (e.g., processors 320 and/or 330).

Figure 4:
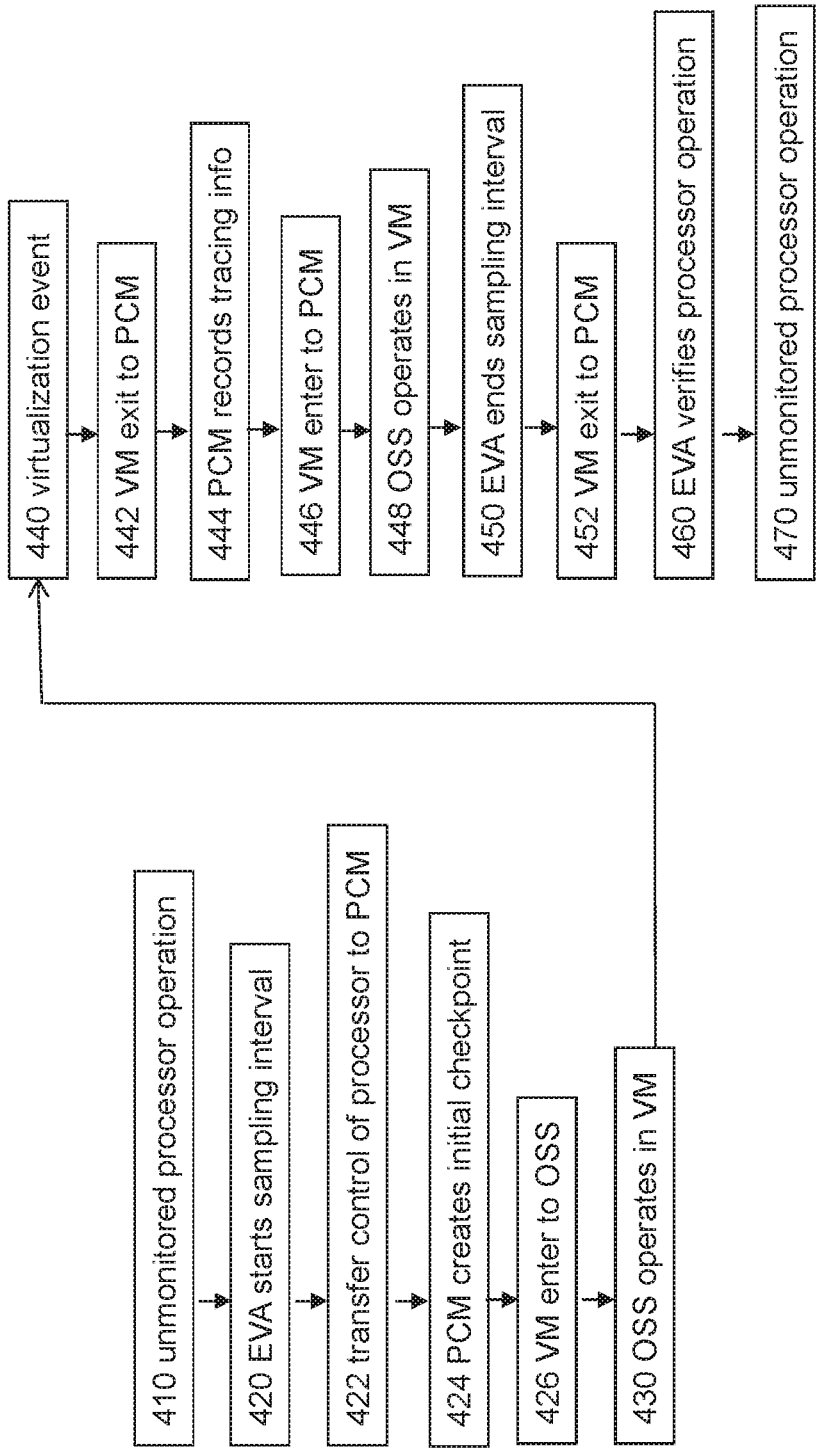
FIG. 4 illustrates a method for monitoring the operation of a processor according to an embodiment of the present invention.

FIG. 4 illustrates method 400 for monitoring the operation of a processor according to an embodiment of the present invention. Although method embodiments of the invention are not limited in this respect, reference may be made to elements of FIGS. 1, 2, and 3 to help describe the method embodiment of FIG. 4. Various portions of method 400 may be performed by hardware, firmware, software, and/or a user of a system such as system 100 and/or 300.

In box 410 of method 400, an information processing system (e.g., system 300) may be operating, with or without a virtualization environment being maintained by a PCM (e.g., PCM 362).

In box 420, an EVA (e.g., EVA 340) sends a first interrupt to one or more processors (e.g., processor 320 and/or 330) in the system to initiate a sampling interval. In various embodiments, other approaches to initiating (and/or terminating) a sampling interval may be used. For example, the EVA may specify a particular time or condition (a particular physical memory location is accessed, a particular interrupt or other event is observed, etc.) at which the PCM is to begin the sampling interval and/or configure the system (e.g., paging structures, debug registers, VMCS, system timers, etc.) such that it may subsequently intercept various events and perform checkpoints as may be instructed by the EVA.

In box 422, delivery of the first interrupt to a processor causes control of the processor (through any combination of a VM exit, interrupt vector, interrupt handling routine, etc.) to be transferred to the PCM. In box 424, the PCM creates an initial checkpoint by storing (e.g., using a save state instruction) the state of certain registers or other storage locations (e.g., state registers 212) in a first data structure in a region of system memory reserved for use by the PCM (e.g., tracing information memory 364). In box 426, the PCM transfers control (e.g., with a VM enter instruction) of the processor to software in an OSS (e.g., OSS 372) running on a VM.

In box 430, software in the OSS operates within the VM, and may be intercepted at various times by PCM, at each of which times the PCM may record tracing information in tracing information memory. Tracing information may include information collected by tracing transactions on memory buses, I/O buses, and multiprocessor socket interconnects. Various events, such as interrupts, attempts to access privileged or designated registers and/or storage and/or memory locations, I/O operations initiated by the OSS, etc., may be intercepted, traced, and emulated or allowed to be handled, completed, and/or executed by the OSS.

For example, in box 440, a second interrupt may be sent from an input/output device (e.g., device 142) or other source to one or more processors. In box 442, delivery of the second interrupt to a processor causes control of the processor (through a VM exit) to be transferred to the PCM. In box 444, the PCM records tracing information (e.g., the interrupt vector) in a second data structure in tracing information memory. In box 446, the PCM transfers control (e.g., with a VM enter instruction) of the processor back to the software in the OSS running on the VM and delivers the second interrupt to the OSS (e.g., in connection with the VM entry, injects into the VM a virtual interrupt corresponding to the second interrupt). In box 448, software in the OSS may handle the second interrupt and then continue to operate within the VM.

In various embodiments, tracing information recorded by the PCM during the sampling interval may include information providing for the EVA to emulate and/or verify the operation of the one or more processors. Such information may include an instruction count and/or any other information to indicate the point within the sampling interval and/or instruction sequence at which each interrupt and/or other event occurred, such that the EVA may accurately emulate the execution of the instruction sequence.

In one embodiment, a counter (e.g., a performance counter provided by a processor) may be used by the PCM to count the number of instructions executed/retired during the sampling interval. The tracing information may include an interrupt trace (e.g., a list of interrupts that occurred during the sampling interval, identified by their interrupt vector) or other event trace, where each interrupt or event is annotated with an instruction count value to indicate the number of instructions executed/retired before the corresponding interrupt or event occurred or was delivered to the OSS (e.g., by the PCM after the PCM intercepted the interrupt or event). Therefore, the EVA may count the instructions as it emulates them to precisely determine the instruction boundary at which to emulate the interrupt or other event. In an embodiment, an interrupt trace may include a list of pairs, with an instruction count value as the first member of the pair and an interrupt vector as the second member of the pair.

In box 450, the EVA sends a third interrupt to the one or more processors to end the sampling interval. In various embodiments, other approaches to terminating a sampling interval may be used. For example, the EVA may specify a particular time or condition (a particular physical memory location is accessed, a particular interrupt or other event is observed, etc.) at which the PCM is to begin the sampling interval.

In box 452, delivery of the third interrupt to the processor causes control of the processor (through a VM exit) to be transferred to the PCM. In box 454, the PCM creates a final checkpoint by storing (e.g., using a save state instruction) the state of certain registers or other storage locations (e.g., state registers 212) in a third data structure in tracing information memory (or alternatively, storing only the state that is different from the state at the start of the sampling interval).

In box 460, the EVA reads the initial checkpoint information, the tracing information, and/or the final checkpoint information from tracing information memory and uses it according to any known approach to check whether the one or more processors operated during the sampling interval according to a specification of the correct and/or expected operation and/or behavior of the one or more processors.

In box 470, the system may continue to operate, with or without the virtualization environment being maintained by the PCM.

In various embodiments of the present invention, various approaches to collecting and verifying checkpoint and tracing information are possible. For example, the EVA's emulation of a processor may include using designated locations in tracing information memory for various processor registers, starting with the state recorded by the PCM at the initial checkpoint, emulating each instruction executed during the sampling interval (including loading and storing the designated locations in tracing information memory instead of the actual processor registers), and comparing the content of the designated locations in tracing information memory to the state recorded by the PCM at the final checkpoint. Any mismatches would represent a verification failure.

Figure 5:
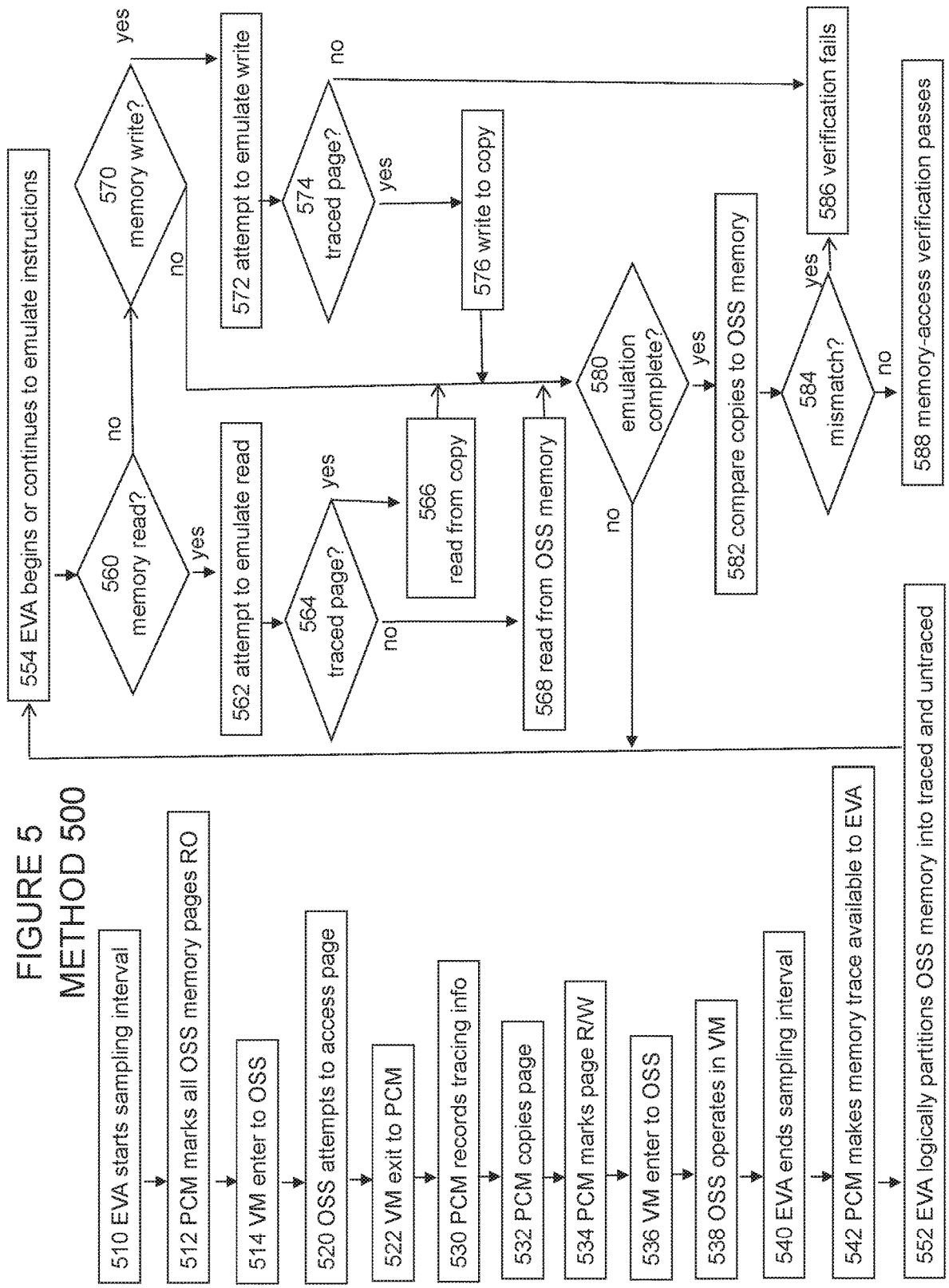
FIG. 5 illustrates a method for verifying a processor's memory accesses according to an embodiment of the present invention.

As another example, FIG. 5 illustrates method 500 for verifying a processor's memory accesses according to an embodiment of the present invention. Method 500 may be used in connection with method 400 or any other method of initiating and ending a sampling interval according to an embodiment of the present invention; therefore, method 500 may refer to initiating and ending a sampling interval without further detail.

In box 510 of method 500, an EVA signals for the initiation of a sampling interval. In box 512, in connection with the initiation of the sampling interval, a PCM (e.g., using MMU 250) marks all pages in and/or accessible to an OSS as read-only. In box 514, the PCM transfers control to the OSS operating within a VM on one or more processors.

In box 520, the OSS attempts to access a first page in memory, marked as read-only. In box 522, the attempted access causes a page-fault, a VM exit, and a transfer of control back to the PCM.

In box 530, the PCM records the address of the first page in a first entry in a memory-tracing data structure in tracing information memory. In box 532, the PCM stores a copy of the initial value/content (i.e., prior to any change by the OSS during the sampling interval) of the first page in memory reserved for the PCM and inaccessible to the OSS (e.g., traced pages memory 366) and/or associates the initial value/content with the first entry. In an embodiment, a memory trace may include a list of pairs, with an address used by the OSS to access a page (e.g., a guest-physical address of the page in OSS memory) as the first member of the pair and a corresponding address to which the PCM copies the value/content of the page (e.g., a host-physical address in traced pages memory) as the second member of the pair. Therefore, both the value/copy of the page and the address at which the EVA may access the value/copy are stored in PCM memory, where it can be accessed by the EVA for emulation, but not by the OSS.

In box 534, the PCM marks the first page as read/write. In box 536, the PCM transfers control back to the OSS in the VM. Therefore, in box 538, the OSS continues to operate, and may now modify (more than once if desired) the value/content of the first page without causing another page-fault, VM exit, or transfer of control back to the PCM. Similarly, each first attempt of the OSS to modify a different page during the sampling interval may cause a page-fault, VM exit, and/or transfer of control back to the PCM to allow the PCM to record the address and initial value/content.

In box 540, the EVA signals for the end the sampling interval. In box 542, in connection with the end of the sampling interval, the PCM makes the memory-tracing data structure and the traced pages available to the EVA.

In box 552, in preparation for emulation, the EVA logically partitions the OSS memory into a group of pages that the PCM entered into (and therefore are found by the EVA in) the traced pages memory and a group of pages that the PCM did not enter into (and therefore are not found by the EVA in) the memory-tracing data structure (e.g., untraced pages 376). In box 554, the EVA begins to emulate the operation of the one or more processors, including the instructions executed, during the sampling interval, using the content of the memory-tracing data structure and the traced pages.

In box 560, the EVA determines whether the processor performed a memory-read access. If so, then in box 562, the EVA attempts to emulate the read. If, in box 564, the EVA determines that the page is a traced page, then, in box 566, the EVA executes the read from the copy of the value/content of the page from the traced pages memory (which, prior to the EVA emulating any writes to the page, will reflect the initial value/content of the page). Instead, if, in box 564, the EVA determines that the page is an untraced page, then, in box 568, the EVA executes the read directly from the page in OSS memory.

In box 570, the EVA determines whether the processor performed a memory-write access. If so, then in box 572, the EVA attempts to emulate the write. If, in box 574, the EVA determines that the page is a traced page, then, in box 576, the EVA executes the write to the copy of the value/content of the page in the traced pages memory. Instead, if, in box 574, the EVA determines that the page is an untraced page, then, the EVA determines that the write represents a verification failure and method 500 ends in box 586.

In box 580, the EVA determines whether the emulation of the sampling interval (or of the instruction stream, or of all memory accesses) is complete. If not, then the EVA returns to box 564 to continue emulation at least until all memory reads and writes have been emulated.

In box 582, after the emulation of the sampling interval is complete, the EVA compares the value/content of each page in the traced pages memory to the value/content of the corresponding page in OSS memory. If, in box 584, the EVA finds a mismatch between the value/content of a traced page in the traced pages memory and OSS memory, then the EVA determines, in box 586, that verification fails. Instead, if, in box 584, the EVA finds that the value/content of all traces pages in the traced pages memory match OSS memory, then the EVA determines, in box 588, that verification of the processor's memory accesses passes.

In various embodiments of the present invention, the methods illustrated in FIGS. 4 and 5 may be performed in a different order, with illustrated boxes combined or omitted, with additional boxes added, or with a combination of reordered, combined, omitted, or additional boxes. For example, a sampling interval may begin or end based on a predetermined time, event, and/or duration, rather than an interrupt from the EVA. Furthermore, method embodiments of the present invention are not limited to method 400, method 500, or variations thereof.

As an alternative (or in addition) to the page-based memory tracing of method 500, a PCM may use a sub-page policy (SPP) to provide more granular indications of when a specific region of a page is written and therefore, emulation is to be performed. For example, SPP may provide for cache-line granularity which would correspond to the granularity of memory tracing logic intercepting the memory bus.

In various embodiments, TLB misses may also be monitored using performance counters and performance monitor interrupts. For example, performance counter thresholds may be used to indicate when a page walk is in process to enable the EVA to emulate paging structure accesses, access/dirty bit assists, etc.

In various embodiments, memory accesses of graphics and/or other devices may be monitored by restricting read/write access to trigger interrupts that may be intercepted by the PCM.

Many other method embodiments (as well as apparatus, system, and other embodiments) not described herein are possible within the scope of the present invention.

A variety of embodiments of the present invention may include a variety of techniques for monitoring the operation of multiple processors/cores (e.g., processor 110 and processor 160). In various embodiments, an EVA and/or a PCM may cause each processor/core to be monitored and/or verified separately, by causing an OSS instruction stream to be executed by a first processor/core during a first sampling interval, causing the same or a different OSS instruction stream to be executed by a second processor/core during a second sampling interval, etc. For example, at initiation of a sampling interval, the EVA may synchronize processors/threads with interrupts to cause a transfer of control of each processor to the PCM, or the PCM may synchronize the processors/threads with inter-processor interrupts. Other processors/threads may be held idle (e.g., in a low power state) during each sampling interval.

Alternatively, in various embodiments, a PCM may cause VM exits at particular instruction boundaries (e.g., using a performance counter to count instructions executed/retired) in an OSS instruction stream in a sampling interval in order to divide or partition the instruction stream into or according to different threads between or among the processors/cores, where the approach to defining the points at which the instruction stream is to be divided and/or the portions of the instruction stream to be executed by each processor/core (a schedule, a list of thread and instruction count pairs, etc.) is deterministic, determined by the EVA and communicated to the PCM in advance, and/or determined by the PCM and communicated to the EVA afterwards. Similarly, interrupts and other events involved in the monitoring may be associated with one or more processors/cores in the tracing information based on a deterministic, a predetermined, and/or a pre/post-interval communication technique, such as one or more lists of which interrupts/events were handled by which processor/core. Therefore, an initial checkpoint, a final checkpoint, an interrupt trace, a memory tracing, and any other desired tracing information may be created for each processor/core during a single sampling interval and used by the EVA to verify the operation of each processor during the single sampling interval.

Figure 6:
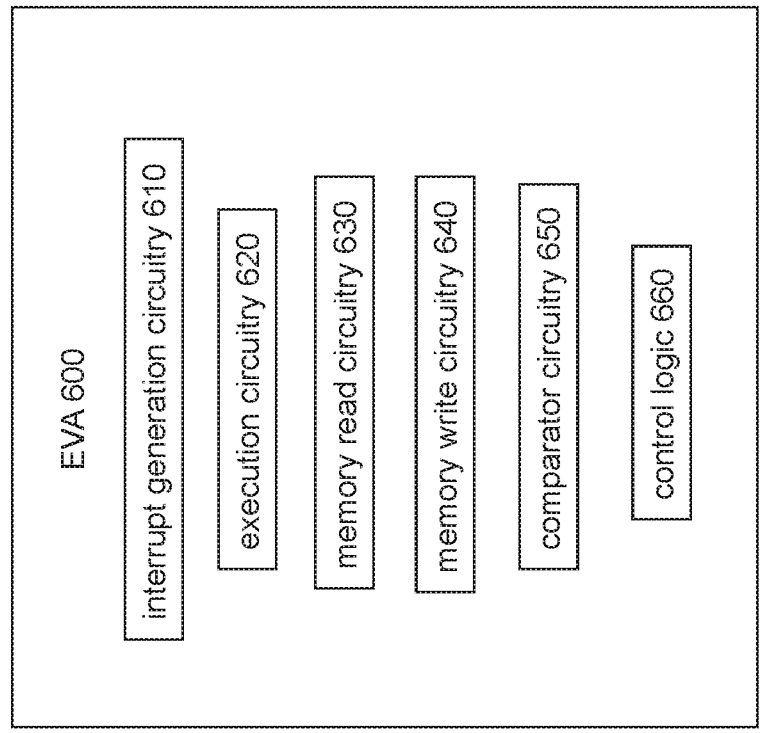
FIG. 6 illustrates an external verification agent according to an embodiment of the present invention.

FIG. 6 illustrates EVA 600 according to an embodiment of the present invention. EVA 600 may include hardware to perform various operations involved in the emulation and/or verification of the operation of one or more processors, as described in method 400, method 500, or otherwise. For example, EVA 600 may include interrupt generation circuitry 610 to generate interrupts to initiate and/or end sampling intervals, execution circuitry 620 to emulate the execution of instructions by a processor, memory read circuitry 630 to perform a read to system memory, memory write circuitry 640 to perform a write to system memory, one or more comparator circuits 650 to perform comparisons (to compare state information after emulation to state information provided by a PCM, to compare value/content of a page in a memory-tracing data structure to a page in OSS memory, etc.), and control logic 660 to control the operation of EVA 600.

Embodiments or portions of embodiments of the present invention, as described above, may be stored on any form of a machine-readable medium. For example, all or part of method 400 or 500 may be embodied in software or firmware instructions that are stored on a medium readable by a processor, which when executed by a processor, cause the processor to execute an embodiment of the present invention. Also, aspects of the present invention may be embodied in data stored on a machine-readable medium, where the data represents a design or other information usable to fabricate all or part of a processor.

Thus, embodiments of an invention for monitoring the operation of a processor have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    an instruction decoder to decode a virtual machine (VM) enter instruction, execution of the VM enter instruction to cause the processor to enter a non-root mode in which guest software is to run on a VM hosted by a virtual machine monitor (VMM), the VMM to run in a root mode in which host software is to directly control system resources;
    a memory management unit to provide for partitioning the system memory into a plurality of memory regions;
    a virtualization unit to provide for the processor to intercept an interrupt occurring in the VM and to cause the processor to exit the VM, wherein the interrupt is from a hardware agent external to the processor and is to initiate a sampling interval; and
    an execution unit to execute a software agent in the root mode to collect tracing information during the sampling interval.

2. The processor of claim 1, wherein the tracing information is to be stored in one or more of the plurality of memory regions accessible to the hardware agent and inaccessible to the VM.

3. The processor of claim 2, wherein the tracing information is to be used by the hardware agent to verify operation of the processor in the non-root mode.

4. The processor of claim 3, wherein the operation of the processor in the non-root mode includes execution of an ordinary software stack by the VM.

5. The processor of claim 4, wherein the processor also includes state storage, and the tracing information is to include an initial checkpoint of the state storage and a final checkpoint of the state storage.

6. The processor of claim 5, wherein the hardware agent is to emulate execution of the ordinary software stack by the processor from an initial state based on the initial checkpoint to a final state and to compare the final state to the final checkpoint.

7. The processor of claim 6, wherein the software agent is to record initial checkpoint information in connection with initiation of the sampling interval and to record final checkpoint information in connection with termination of the sampling interval.

8. The processor of claim 7, wherein the hardware agent is also to interrupt the processor to terminate the sampling interval.

* * * * *